(12) United States Patent
Pawusch

(10) Patent No.: US 9,612,463 B2
(45) Date of Patent: Apr. 4, 2017

(54) DISPLAY DEVICE HAVING A LIQUID CRYSTAL DISPLAY AND METHOD FOR PROTECTING A LIQUID CRYSTAL DISPLAY

(75) Inventor: Wolfgang-Peter Pawusch, Hochheim (DE)

(73) Assignee: Continental Automotive GmbH, Hannover (DE)

( * ) Notice: Subject to any disclaimer, the term of this patent is extended or adjusted under 35 U.S.C. 154(b) by 347 days.

(21) Appl. No.: 14/127,367

(22) PCT Filed: Jun. 21, 2012

(86) PCT No.: PCT/EP2012/061959
§ 371 (c)(1),
(2), (4) Date: Dec. 18, 2013

(87) PCT Pub. No.: WO2012/175609
PCT Pub. Date: Dec. 27, 2012

(65) Prior Publication Data
US 2014/0132852 A1  May 15, 2014

(30) Foreign Application Priority Data
Jun. 22, 2011 (DE) ........................ 10 2011 105 689

(51) Int. Cl.
*G02F 1/133* (2006.01)
*G02B 27/01* (2006.01)
(Continued)

(52) U.S. Cl.
CPC ..... *G02F 1/13306* (2013.01); *G02B 27/0149* (2013.01); *G02B 2027/0156* (2013.01);
(Continued)

(58) Field of Classification Search
None
See application file for complete search history.

(56) References Cited

U.S. PATENT DOCUMENTS 4,804,836 A    2/1989  Iino
4,886,328 A   12/1989  Iino
(Continued)

FOREIGN PATENT DOCUMENTS

DE    43 38 579      7/1994
DE   100 44 221      4/2001
(Continued)

*Primary Examiner* — Richard Kim
(74) *Attorney, Agent, or Firm* — Cozen O'Connor

(57) ABSTRACT

A display device with a liquid crystal display and a method for protecting the liquid crystal display are provided. The display device includes a liquid crystal display for displaying an image, a sensor system for detecting the illuminance of an incident optical radiation and for determining the current position of the Sun relative to the liquid crystal display, an adjustable shading device for protecting the liquid crystal display from the incident optical radiation, and a control unit. The control unit checks if the illuminance detected by the sensor system exceeds a predefined threshold value and if the current position of the Sun is in a predefined angle range, and controls the shading device according to a result of the check such that the shading device interrupts a beam path of a part of the optical radiation incident on the liquid crystal display.

17 Claims, 3 Drawing Sheets

(51) Int. Cl.
 *G09G 3/00* (2006.01)
 *G09G 3/36* (2006.01)

(52) U.S. Cl.
 CPC ............... *G09G 3/001* (2013.01); *G09G 3/36* (2013.01); *G09G 2330/045* (2013.01); *G09G 2360/144* (2013.01); *G09G 2380/10* (2013.01)

(56) References Cited

U.S. PATENT DOCUMENTS

| | | |
|---|---|---|
| 5,298,732 A | 3/1994 | Chen |
| 2010/0094501 A1 | 4/2010 | Kwok |

FOREIGN PATENT DOCUMENTS

| | | |
|---|---|---|
| JP | 2005-331624 | 12/2005 |
| JP | 2006-011168 | 1/2006 |
| JP | 2006-082593 | 3/2006 |
| WO | WO 2011/001584 A2 | 2/2011 |

…

DISPLAY DEVICE HAVING A LIQUID CRYSTAL DISPLAY AND METHOD FOR PROTECTING A LIQUID CRYSTAL DISPLAY

CROSS-REFERENCE TO RELATED APPLICATIONS

This is a U.S. national stage of application No. PCT/EP2012/061959, filed on 21 Jun. 2012, which claims priority to the German Application No. 10 2011 105 689.4, filed 22 Jun. 2011, the content of both incorporated herein by reference.

BACKGROUND OF THE INVENTION

1. Field of the Invention

The present invention relates to a display device having a liquid crystal display, for example a head-up display, and to a method for protecting the liquid crystal display of a corresponding display device against incident solar radiation.

2. Related Art

Display devices having liquid crystal displays should not be exposed to direct and intense optical radiation, such as solar radiation, for a prolonged period of time. Owing to the radiation that is incident on the liquid crystal display, the temperature of the liquid crystal display increases and the display may lose its physical properties if the temperature increases too much. In this case, the display clears, and any displayed image information is lost. Even though such a process is generally reversible, irreversible damage may occur if the liquid crystal display is exposed for a prolonged period of time or relatively frequently.

In motor vehicles having a head-up display (HUD) as a display device, solar rays can pass through a windscreen of the vehicle and, in the case of an unfavorable position of the Sun, impinge directly on the display. The head-up display or front-view display projects an image through a beam path onto the windscreen of the vehicle, which serves as the projection surface, which image can be perceived by the occupants of the vehicle as a virtual image. However, as long as the optical radiation is incident at a particular angle, not only the image is projected, but also the radiation that is incident on the vehicle is guided directly onto the display and concentrated on the display surface owing to a mirror optical system present in the beam path of the head-up display. If the liquid crystal display is irreversibly damaged, for example when stopping in the sunshine for a long period of time, what is referred to as a "bonanza effect" can occur in a virtual image displayed by the head-up display, in which artifacts caused by the irreversible damage remain visible in the virtual image.

In order to avoid such irreversible damage to a liquid crystal display, in the case of the head-up displays known from the prior art, for example a polarization filter is mounted in front of the display, which lets only a portion of the incident radiation having a particular polarization direction through, with this polarization direction corresponding to a polarization direction of the display. By way of example, only s-polarized light may pass through the polarization filter. As a result, heating of the liquid crystal display is reduced and the point of time at which the bonanza effect first occurs is delayed. The disadvantage here is that the polarization filter decreases the performance and image sharpness of the liquid crystal monitor and that increased power consumption and associated heat losses are necessary in order to achieve a sufficiently high transmission of the liquid crystal display despite the filters.

SUMMARY OF THE INVENTION

It is therefore an object of the present invention to provide a display device having a liquid crystal display which permits the avoidance of damage to the liquid crystal display on account of very high solar radiation, without thereby negatively affecting a reproduction quality of the display device. It is a further object of the invention to provide a method for protecting a liquid crystal display with which the disadvantage can be avoided, but which permits the reliable avoidance of any irreversible damage to the liquid crystal display on account of solar radiation.

This object is achieved according to the invention by a display device and a method as described herein.

According to one aspect of the present invention, the proposed display device comprises a liquid crystal display for reproducing an image, a sensor system for ascertaining the illuminance of incident optical radiation and for determining a current position of the Sun relative to the liquid crystal display, an adjustable shading device for protecting the liquid crystal display against the incident optical radiation, and a control unit. The term "optical radiation" is not intended to be used solely to be capable of denoting visible light with a wavelength of 400 nm to 780 nm, but also infrared light and/or ultraviolet light. The control unit is adapted to check whether the illuminance ascertained by the sensor system is above a predetermined threshold value and whether the current position of the Sun lies within a predetermined angular range. Furthermore, the control unit is further adapted to actuate, in dependence on a result of this check, the shading device such that it interrupts a beam path of a portion of the optical radiation that is incident on the liquid crystal display and thus protects the liquid crystal display against damage.

The illuminance and the current position of the Sun are two parameters that are easy to determine and indicate whether the intensity of the optical radiation is at all sufficient to damage the liquid crystal display and whether said radiation is incident on the liquid crystal display. By checking these parameters using the control unit, it is thus possible to reliably determine whether the liquid crystal display can be damaged. The actuation of the shading device for protecting the liquid crystal display in dependence on the result of the check makes it possible for the display device to be operated normally as long as any risk of damage to the liquid crystal display is ruled out and therefore also for protection mechanisms that adversely affect normal operation and are provided from the start to be omitted, while still protecting the liquid crystal display in the case of risk of damage and to interrupt image reproduction if a disturbance of the image reproduction owing to the failing liquid crystal display is expected in any case.

The predetermined angular range of the position of the Sun can cover those angles in which the optical radiation is incident directly on the liquid crystal display. The predetermined threshold value is preferably defined by the value of the illuminance from which irreversible damage to the liquid crystal display occurs if it is exposed to the incident optical radiation.

In one aspect, the shading device is preferably adjustable between an activated state, in which it interrupts the beam path, and a non-activated state. The control unit can then be adapted to activate the shading device exactly at that point at which a condition, defined in dependence on the result of the check, is met. A suitable definition of the condition can be used to ensure that the beam path is interrupted only if temporary or irreversible damage to the liquid crystal display is expected in any case and thus image reproduction would be disturbed or interrupted. This condition can be such that only if both the preconditions are present, that is to say if the ascertained illuminance is above the threshold value and the Sun is at a particular angle, the liquid crystal display is protected and reproduction of the image is interrupted, so that premature interruption of the beam path and thus of the image reproduction is prevented. The condition can also require the presence of additional situations, such as a critical temperature being exceeded.

According to one aspect, provision may accordingly be made for the display device to have a temperature sensor mounted in or on the liquid crystal display or arranged in a surrounding area of the liquid crystal display, which temperature sensor measures a temperature of the liquid crystal display or of an area surrounding the liquid crystal display. The control unit can be adapted in this case such that the shading device is activated only if the temperature measured by the temperature sensor exceeds a predetermined threshold value. The condition is in that case defined as requiring a limit temperature determined by the threshold value to be exceeded. Owing to the threshold value of the temperature that is measured preferably directly on the temperature-sensitive liquid crystal display being predetermined in a suitable manner, the liquid crystal display is interrupted only in the case of imminent damage, such that image reproduction continues up to this point.

The sensor system can, according to one aspect, comprise a computing unit adapted to calculate the current position of the Sun from a date, a time of day, a location and a compass direction. Owing to the calculation it is possible for a complicated measurement of the position of the Sun to be avoided, especially since the current position of the Sun is calculable reliably and uniquely from these parameters. The location and the compass direction are preferably defined by geographic position data, particularly preferably GPS data. The use of GPS data enables precise and simple determination of the location and the compass direction in which the display device is oriented.

In an advantageously simple-to-realize configuration, the shading device comprises a screen that is foldable in front of the liquid crystal display and/or into the beam path in order to interrupt the beam path. Alternatively or additionally, the shading device can comprise a pivotable mirror arranged in the beam path of the incident optical radiation and serve to image the images reproduced on the liquid crystal display. By using the mirror, which is arranged in the beam path of the display device in any case, as the shading device or part of the shading device, additional components can be largely dispensed with. The beam path can therefore be interrupted and the liquid crystal display protected against incident optical radiation very simply by tilting the mirror.

In one aspect, the display device is preferably a head-up display. In a head-up display, the liquid crystal display is generally not capable of being viewed directly by a user, such that radiation that is incident on the liquid crystal display also remains unnoticed. In display devices of this type it is therefore particularly favorable for an automatically activatable protection device to be provided for such display types.

In addition, provision may be made for the sensor system or a part thereof to be arranged spatially separate from the liquid crystal display. Owing to the spatial separation of sensor system and liquid crystal display, already available sensor systems can be used for the display device, for example a brightness sensor, which may be present already as a day/night sensor for automatically actuating headlamps and rear position lamps. In this way, the described display device can be implemented with a minimum of additional outlay. The sensor system is preferably connected, via a bus system, particularly preferably via a CAN bus system, to the control unit for transmitting the ascertained illuminance. Such bus systems have the advantage of permitting a quick data exchange without major configuration problems. Moreover, already existing sensor systems that provide the data via a bus system can thus be incorporated in the display device in a simple manner. A CAN bus system is a common bus system in the field of motor vehicles.

A vehicle, preferably a motor vehicle such as a car or a truck, advantageously comprises the display device with the described properties. In vehicles, the risk of damage to the liquid crystal display, owing to prolonged driving or stopping in sunshine, is particularly high, and therefore the display device can be used advantageously in this case.

In one advantageous aspect, provision may be made for the sensor system or part of the sensor system with which the illuminance is measured to be arranged on a dashboard and/or below a windscreen of the vehicle. The incident radiation can be detected simply in this case since no shadow-casting objects obstruct it. If the display device is a head-up display, the windscreen is used as the projection surface or as a semi-transparent mirror for imaging the reproduced images such that the optical radiation that is incident on the windscreen can reach the liquid crystal display through the beam path of the display device. Mounting the sensor system in this location therefore has the advantage in this case that the illuminance is measured at the place where the radiation that is guided to the liquid crystal display is incident.

According to another aspect of the present invention, a correspondingly advantageous method for protecting a liquid crystal display of a display device against incident solar radiation comprises the following steps:

ascertaining an illuminance of a solar radiation that is incident in an area surrounding the display device; determining a current position of the Sun relative to the liquid crystal display; transmitting the ascertained illuminance and the determined current position of the Sun to a control unit and checking, using the control unit, whether the ascertained illuminance is above a predetermined threshold value of the illuminance and whether the current position of the Sun lies within a predetermined angular range; in dependence on a result of the check, automatically interrupting a beam path of a portion of the solar radiation that is incident on the liquid crystal display using a shading device actuated by the control unit.

The ascertainment of the illuminance makes it possible to check whether the illuminance is sufficiently high to damage the liquid crystal display or put it at risk, while it is possible, by determining the current position of the Sun relative to the liquid crystal display, to ascertain whether the liquid crystal display is exposed to part of the incident solar radiation at all. It is thus possible to protect the liquid crystal display against incident solar radiation only in that case by using the shading device actuated by the control unit, and to thereby ensure image reproduction via the display device for as long as possible.

In one advantageous aspect, the current position of the Sun is calculated, using a computing unit, from a date, a time of day, a location and a compass direction. On account of this, no complicated direct measurement of the position of the Sun is necessary while it is still possible to reliably determine the position of the Sun. The location and the compass direction are preferably calculated from geographic position data, particularly preferably GPS data. Geographic position data permit simple determination of that parameters.

In another aspect, the method may further provide for a temperature of the liquid crystal display to be ascertained by a temperature sensor and for the beam path of the incident optical radiation to be automatically interrupted only if a predetermined threshold value of the temperature is exceeded. The threshold value can be defined for example such that the beam path is interrupted only if a limit temperature at which a temporary or irreversible damage to the liquid crystal display occurs or is imminent is exceeded and the image reproduction is consequently maintained for as long as possible.

The method can advantageously be carried out using the previously described display device.

BRIEF DESCRIPTION OF THE DRAWINGS

FIGS. 1 to 3 illustrate exemplary embodiments of the invention, which are explained using three figures below, in which:

FIG. 1 is a schematic illustration of a display device with optical radiation incident on a liquid crystal display;

FIG. 2 is a flowchart of a method for protecting a liquid crystal display; and

FIG. 3 is a flowchart of a further embodiment of the method for protecting a liquid crystal display.

DETAILED DESCRIPTION OF THE PRESENTLY PREFERRED EMBODIMENTS

Figure 1:
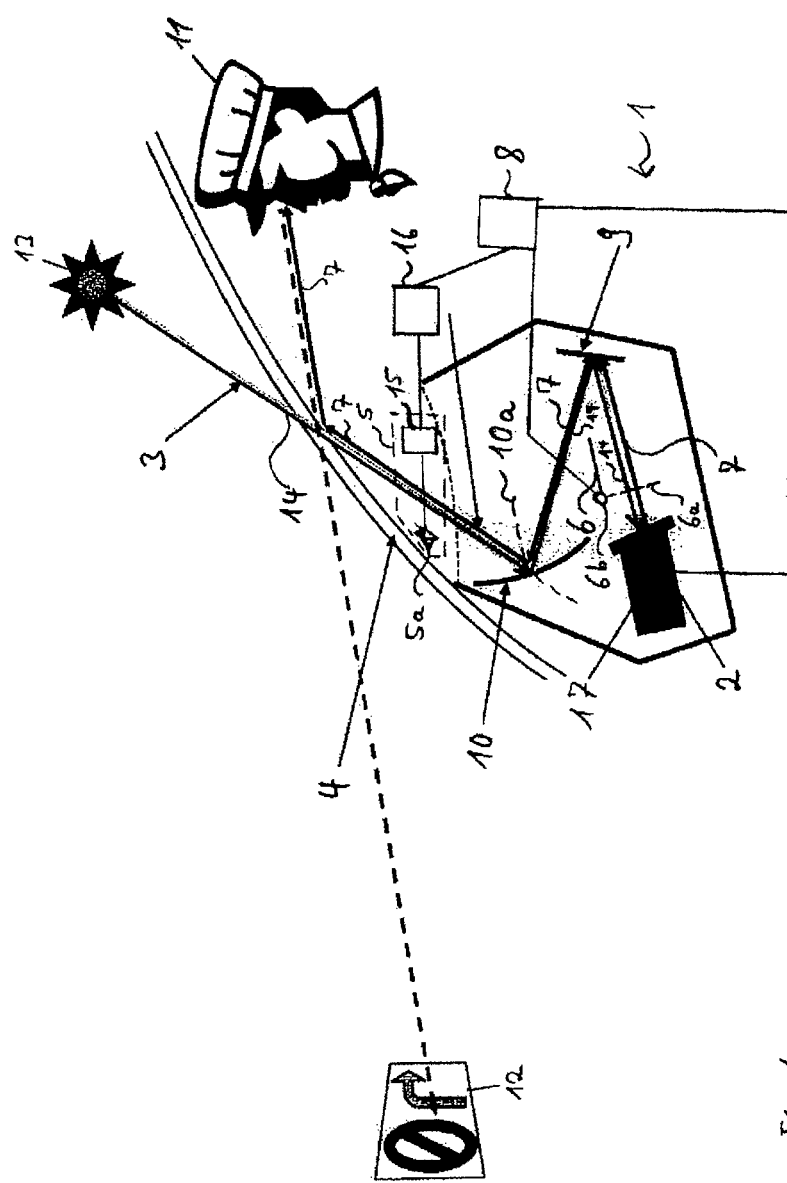

FIG. 1 illustrates, in schematic illustration, a display device 1 with optical radiation 3, in this case solar radiation, incident on a liquid crystal display 2. The display device 1 is a head-up display, which is arranged in a vehicle that is indicated merely by way of a windscreen 4. The display device 1 comprises, in addition to the liquid crystal display 2, a sensor system 5, which is arranged below the windscreen 4 on a dashboard of the vehicle, and an adjustable shading device, which can interrupt a beam path 7 of the display device 1. The shading device in the illustrated exemplary embodiment is a screen 6 made of plastic, which screen is foldable about a rotational axis 6b. In addition, the display device 1 comprises a control unit 8. The liquid crystal display 2 in the exemplary embodiment illustrated in FIG. 1 is a TFT display, that is to say a display comprising thin-film transistors.

The liquid crystal display 2 reproduces an image which is projected by the beam path 7 onto the windscreen 4. To this end, a flat mirror 9, having an aluminum layer as the reflective surface, and an aspherical mirror 10 are present in the beam path 7, which aspherical mirror 10 likewise has an aluminum layer as the reflective surface and is pivotable and has an aspherical curvature to adjust the size of the image projected onto the windscreen 4. A vehicle occupant 11 thus perceives the image projected onto the windscreen 4 as a virtual image 12 which is superposed onto a real vehicle environment and can display, for example, directional information of a navigation device (not illustrated in FIG. 1). In very general terms, the display device 1 can be a display apparatus of a driver assistance system.

The optical radiation 3 emanates from the Sun 13 and is guided at least partially through a beam path 14 via the aspherical mirror 10 and the flat mirror 9 onto the liquid crystal display 2. The beam path 14 of the solar radiation after passing through the windscreen 4 coincides with the beam path 7 of the display device 1.

The optical radiation 3 is also incident on the sensor system 5, which ascertains the illuminance of the optical radiation 3 and a current position of the Sun relative to the liquid crystal display 2. For ascertaining the illuminance, the sensor system 5 comprises in the illustrated exemplary embodiment a photometer 5a, which is present in the form of a CCD detector or at least a photodiode. In the exemplary embodiment illustrated, the sensor system 5 additionally comprises a computing unit 15, which is adapted to calculate the current position of the Sun. To this end, a date, a time of day, a location of the vehicle and a compass direction in which a display surface of the liquid crystal display 2 is oriented, is used. The location and the compass direction resulting from a driving direction of the vehicle are ascertained by GPS data, which are received either by a GPS receiver in the sensor system 5 or by a GPS receiver located elsewhere in the vehicle, for example included in the navigation system, and are transmitted to the computing unit 15 via a bus system. It is of course also possible to use other geographic position data instead of GPS data, for example data from the Galileo system or the GLONASS system.

The sensor system 5 is arranged spatially separate from the liquid crystal display 2 and transmits the ascertained illuminance and the current position of the Sun via a CAN bus system 16 to the control unit 8. The photometer 5a and the computing unit 15 can likewise be spatially separate from one another, in the exemplary embodiment illustrated in FIG. 1 both components are located below the windscreen 4. The photometer 5a of the sensor system 5 can also be a sensor which is provided in the vehicle in any case, for example a sensor of an air-conditioning unit or of automatic vehicle light control.

The control unit 8, which is arranged in or on the head-up display, but may also be a component of an on-board computer or an instrument cluster arranged in the dashboard, checks whether the illuminance ascertained by the sensor system 5 is above a predetermined threshold value and whether the current position of the sun lies within a predetermined angular range. The predetermined threshold value of the illuminance is chosen such that if optical radiation 3 with an illuminance above the threshold value is incident on the liquid crystal display 2, irreversible or at least temporary damage to the liquid crystal display 2 occurs or is imminent. The predetermined angular range is defined to comprise all possible positions of the Sun at which solar radiation may be incident on the liquid crystal display 2. In the embodiment illustrated in FIG. 1, a temperature sensor 17, which measures a temperature of the liquid crystal display 2, is also mounted on the liquid crystal display 2. The temperature sensor 17 may also be mounted in the liquid crystal display 2 and in this case measure the internal temperature. The measured temperature is likewise transmitted to the control unit 8 and checked to determine whether it exceeds a predetermined limit value.

In dependence on a result of the check, the control. unit 8 actuates the shading device, that is to say the screen 6 in the illustrated exemplary embodiment, such that the latter is folded in front of the liquid crystal display 2 and interrupts the beam path 7 of the display device 1 and thus also the beam path 14 of the incident optical radiation 3, and thus protects the liquid crystal display 2. The screen 6 is to this end brought by the control unit 8 from a non-activated state, in which the beam path 14 is not interrupted, into an activated state 6*a*, in which it is located in front of the liquid crystal display 2 and interrupts the beam path 14, precisely when a condition that is defined in dependence on the result of the check is met. This condition is defined as being met precisely when the illuminance is above the threshold value, the current position of the Sun lies within said angular range, and the temperature measured using the temperature sensor 17 exceeds the limit value, that is to say a predetermined limit temperature. If this condition is met, the control unit 8 activates the screen 6, that is to say the screen 6 pivots into the beam path 14 of the incident optical radiation 3. The activated state 6*a* of the screen 6 is indicated in FIG. 1 by a dashed line. To this end, the screen 6 is pivoted about the rotational axis 6*b*.

Instead of the screen 6, or in addition to the screen 6, the spherical mirror 10 can be provided as the shading device or as part of the shading device and be tilted into a position 10*a*, shown in dashed lines, in order to interrupt the beam path 7 such that the beam path 14 of the incident optical radiation 3 and the beam path 7 of the display device 1 are interrupted.

Before the beam path 14 is interrupted by the control unit 8, it is possible for a warning notice to be output to the vehicle occupant 11 on an on-board computer (not illustrated in FIG. 1) or on the liquid crystal display 2 itself to the effect that the image reproduction will soon stop so as to prevent the liquid crystal display 2 from being damaged.

Figure 2:
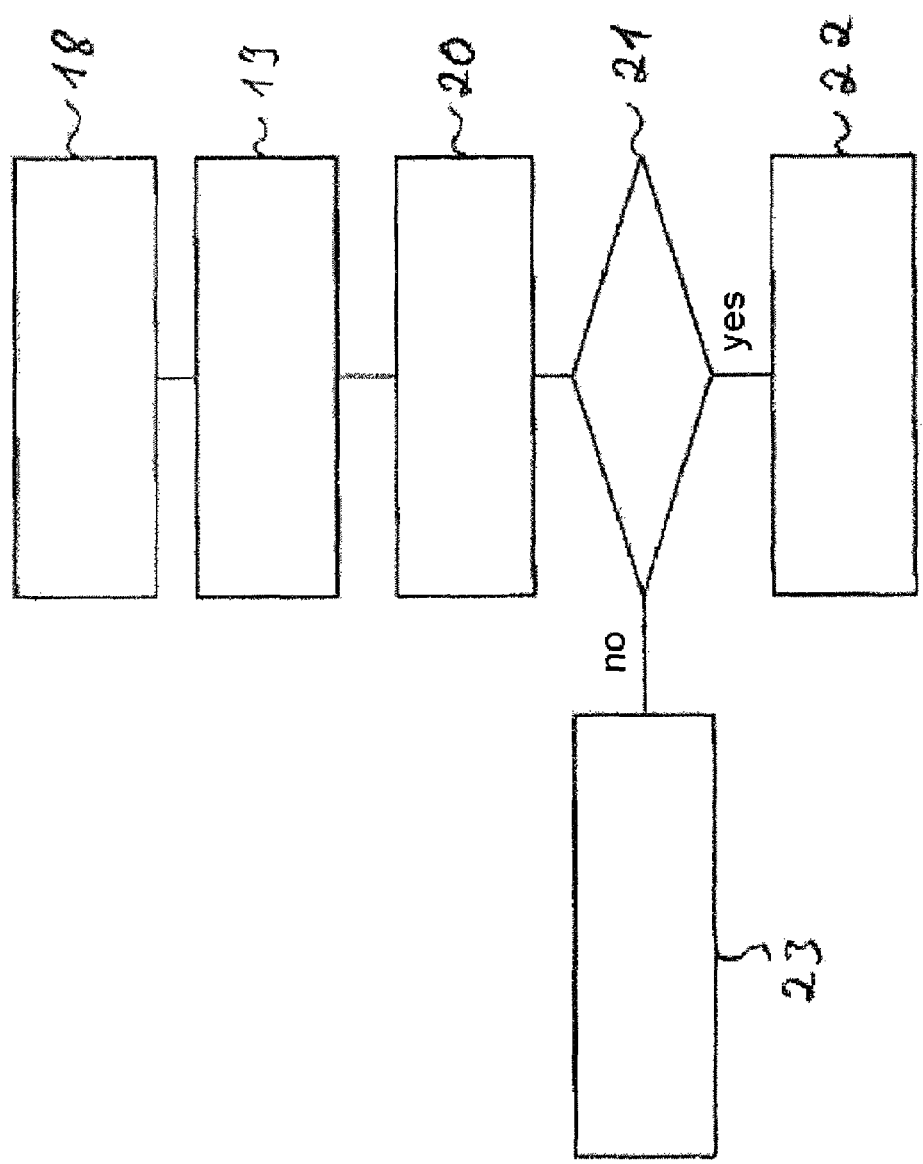

FIG. 2 shows a flowchart of a method for protecting the liquid crystal display 2 of the display device 1. The method comprises first, as a step 18, ascertaining the illuminance of the solar radiation that is incident in an area surrounding the display device 1 using the photometer 5*a* of the sensor system 5. In a step 19, the current position of the Sun relative to the liquid crystal display 2 is also determined by evaluating GPS data using the computing unit 15. The ascertained illuminance and the ascertained position of the Sun are transmitted to the control unit 8 in a further step 20. The control unit 8 checks 21 whether the ascertained illuminance is above a predetermined threshold value of the illuminance and whether the current position of the Sun lies within the predetermined angular range, consequently whether the liquid crystal display 2 can be damaged by the incident optical radiation 3. In dependence on the result of the check, in step 22, depending on the result, the beam path 14 of the portion of the optical radiation 3 that is incident on the liquid crystal display 2 is automatically interrupted by the control unit 8 actuating the shading device such that the latter changes over into the activated state 6*a*, or not. The beam path 14 is here automatically interrupted if the ascertained illuminance exceeds the predetermined threshold value and the current position of the Sun lies within the predetermined angular range. If the threshold value is not reached or if the current position of the Sun does not lie within the predetermined angular range, that is to say if the check 21 gives a negative result, the control unit 8 does nothing, that is to say in step 23, the beam path 14 is not interrupted and the shading device remains in its original, non-activated state. Accordingly, the shading device is pivoted back into the non-activated state as soon as the previous condition is no longer met.

The current position of the Sun is, in the method illustrated in FIG. 2, calculated by the computing unit 15 from the date, the time of day, the location and the compass direction, wherein the location and the compass direction are calculated from GPS data. The compass direction can in this case be defined as the current orientation of the liquid crystal display 2 or by the vehicle longitudinal axis. Alternatively, the position of the Sun can also be measured.

The method can be carried out both in the case of image reproduction by the display device 1 and also when the latter is switched off and does not display an image. The method is carried out in real time with a cycle time of 10 ms such that the liquid crystal display 2 is permanently monitored.

Provision may be made for the control unit 8 to additionally check whether the illuminance exceeds the threshold value for a predetermined period of time and/or whether the current position of the Sun lies within the predetermined angular range for the predetermined period of time. The automatic interruption of the beam path 14 is in this case initiated only if this condition is met at least for a duration that corresponds to said period of time.

Figure 3:
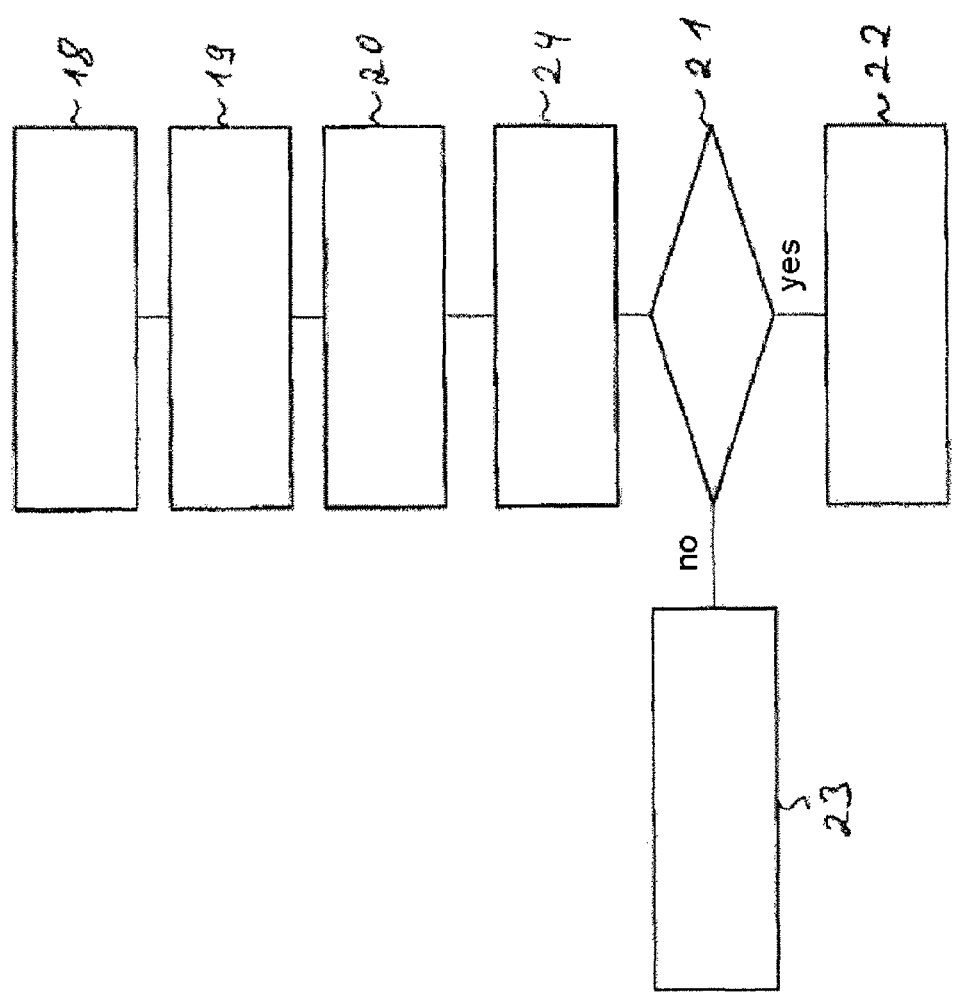

FIG. 3 illustrates a further embodiment of the method for protecting the liquid crystal display 2, again as a flowchart. The flowchart here corresponds to that illustrated in FIG. 2, except in this case, as described previously in combination with FIG. 1, in addition to the position of the Sun and the illuminance, the temperature of the liquid crystal display 2 is ascertained by the temperature sensor 17 mounted on or in the liquid crystal display 2 in an additional step 24. The beam path 14 of the incident optical radiation 3 is in that case automatically interrupted, on the basis of a corresponding program of the control unit 8, only if a predetermined threshold value of the temperature is exceeded and if the illuminance is above the threshold value and if the current position of the Sun lies within the predetermined angular range. The methods illustrated in FIGS. 2 and 3 can be carried out using the display device 1 illustrated in FIG. 1. In a modification of the method of FIG. 3, provision may be made that the temperature must first exceed the threshold value for a particular period of time before the automatic interruption of the beam path 14 is initiated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A display device (1), comprising:
a liquid crystal display (2) configured to reproduce an image;
a sensor system (5) configured to ascertain an illuminance of incident optical radiation (3) and determine a current position of the Sun relative to the liquid crystal display (2);
an adjustable shading device configured to protect the liquid crystal display (2) against the incident optical radiation (3), wherein the adjustable shading device comprises a screen (6) foldable in front of the liquid crystal display (2) and/or into the beam path (14) and/or a pivotable mirror (10) arranged in the beam path (14)

of the incident optical radiation (3) and which serves to image the images reproduced on the liquid crystal display (2);

a temperature sensor (17), mounted in or on the liquid crystal display (2), configured to measure a temperature of the liquid crystal display (2); and a control unit (8) configured to:
(i) check whether the illuminance ascertained by the sensor system (5) exceeds a predetermined threshold value, whether the current position of the Sun lies within a predetermined angular range, and whether the temperature measured by the temperature sensor (17) exceeds a predetermined threshold value, and
(ii) actuate, in dependence on a result of the check in step (i), the shading device such that it interrupts a beam path (14) of a portion of the optical radiation (3) incident on the liquid crystal display (2).

2. The display device (1) as claimed in claim 1, wherein the shading device is adjustable between an activated state (6a), in which it interrupts the beam path (14), and a non-activated state, wherein the control unit (8) is configured to activate the shading device exactly at a point at which a condition defined in dependence on the result of the check is met.

3. The display device (1) as claimed in claim 1, wherein the control unit (8) is configured to activate the shading only if the temperature measured by the temperature sensor (17) exceeds a predetermined threshold value.

4. The display device (1) as claimed in claim 1, wherein the sensor system (5) comprises a computing unit (15) configured to calculate the current position of the Sun from a date, a time of day, a location and a compass direction.

5. The display device (1) as claimed in claim 4, wherein the location and the compass direction are defined by geographic position data.

6. The display device (1) as claimed in claim 5, wherein the geographic position data is GPS data.

7. The display device (1) as claimed in claim 1, wherein the display device (1) is a head-up display.

8. The display device (1) as claimed in claim 1, wherein the sensor system (5) is arranged spatially separate from the liquid crystal display (2), wherein the sensor system (5) is connected, via a bus system, to the control unit (8) for transmitting the ascertained illuminance.

9. The display device (1) as claimed in claim 8, wherein the bus system is a CAN bus system (16).

10. A vehicle, comprising a display device (1) as claimed in claim 1.

11. The vehicle as claimed in claim 10, wherein the sensor system (5) is arranged on a dashboard and/or below a windscreen (4) of the vehicle.

12. The display device (1) as claimed in claim 1, wherein the liquid crystal display (2) is stationary.

13. A method for protecting a liquid crystal display (2) of a display device (1) against incident solar radiation, the method comprising the steps of:

ascertaining (18) an illuminance of a solar radiation that is incident in an area surrounding the display device (1);

determining (19) a current position of the Sun relative to the liquid crystal display (2);

ascertaining (24) a temperature of the liquid crystal display (2);

transmitting (20) the ascertained illuminance, the determined current position of the Sun, and the ascertained temperature of the liquid crystal display to a control unit (8);

checking (21), using the control unit (8), whether the ascertained illuminance exceeds a predetermined threshold value of the illuminance, whether the current position of the Sun lies within a predetermined angular range, and whether the ascertained temperature exceeds a predetermined value; and in dependence on a result of the checking (21), automatically interrupting (22) a beam path (14) of a portion of the solar radiation that is incident on the liquid crystal display (2) using a shading device actuated by the control unit (8), wherein the shading device comprises a screen (6) foldable in front of the liquid crystal display (2) and/or into the beam path (14) and/or a pivotable mirror (10) arranged in the beam path (14) of the incident optical radiation (3) and which serves to image the images reproduced on the liquid crystal display (2).

14. The method as claimed in claim 13, wherein the current position of the Sun is calculated from a date, a time of day, a location and a compass direction.

15. The method as claimed in claim 14, wherein the location and the compass direction are defined by geographic position data.

16. The method as claimed in claim 15, wherein the geographic position data is GPS data.

17. The method as claimed in claim 13, wherein the beam path (14) of the incident optical radiation (3) is automatically interrupted only if a predetermined threshold value of the temperature is exceeded.

* * * * *